May 26, 1959 L. W. HERSHINGER 2,888,512

INDEXING SYSTEM FOR COLOR TELEVISION RECEIVERS

Filed Oct. 11, 1955 4 Sheets-Sheet 1

INVENTOR.
LINCOLN W. HERSHINGER
BY
[signature]
ATTORNEY

May 26, 1959 L. W. HERSHINGER 2,888,512

INDEXING SYSTEM FOR COLOR TELEVISION RECEIVERS

Filed Oct. 11, 1955 4 Sheets-Sheet 2

INVENTOR.
LINCOLN W. HERSHINGER
BY
[signature]
ATTORNEY

INDEXING SYSTEM FOR COLOR TELEVISION RECEIVERS

Filed Oct. 11, 1955

INVENTOR.
LINCOLN W. HERSHINGER
BY
[signature]
ATTORNEY

INVENTOR.
LINCOLN W. HERSHINGER
BY
Oscar V. Hazeltine
ATTORNEY 2,888,512

INDEXING SYSTEM FOR COLOR TELEVISION RECEIVERS

Lincoln W. Hershinger, Oreland, Pa., assignor to Philco Corporation, Philadelphia, Pa., a corporation of Pennsylvania Application October 11, 1955, Serial No. 539,777

10 Claims. (Cl. 178—5.4)

The invention relates to an improved color television receiver system and, more particularly, to an improved system for displaying the information conveyed by a color television signal upon the screen structure of a single cathode ray tube.

The kind of screen structure with which the invention is particularly concerned is principally constituted of a plurality of narrow phosphor strips, disposed parallel to each other and extending in a direction transverse to the horizontal line scanning direction. Different ones of these phosphor strips are made of materials responsive to electron impingement to emit light in different primary colors and are disposed side-by-side in such manner that the scanning electron beam traverses strips emissive of light of these different colors in regularly recurrent sequence during each horizontal scan across the screen structure. This form of screen structure is peculiarly suited to the reproduction of the intelligence conveyed by a color television signal of the form which is now standard for this country because this standard signal represents, during regularly recurrent time-spaced intervals, the intensities of the different primary color components of the televised scene.

In theory it is clearly possible to coordinate the screen phophor distribution and the beam scanning rate with each other and with the color signal in such manner that there exists precise synchronism between the times of occurrence of the intervals during which the signal is representative of a given color and of the intervals during which the beam impinges upon screen phosphor strips emissive of light of that color.

In practice, however, it has proven economically unfeasible to impose sufficiently close tolerances on the phosphor distribution and on the beam scanning rate to insure this synchronism. Since departures from synchronism also result in color distortion in the reproduced image it has been found desirable to provide additional apparatus for sensing such departures and for modifying the beam scanning rate and/or the rate of occurrence of intervals during which the received signal is representative of color information so as to reestablish the desired synchronism.

To this end prior art receivers have been equipped with apparatus for deriving, from the screen structures of their cathode ray tubes, an electrical signal which has one given magnitude whenever the beam of the tube impinges upon certain spaced-apart portions of the screen and which has a different magnitude whenever the beam impinges upon intervening portions of this screen. If synchronism between the beam scan and the color signal exists then the beam actually traverses the said spaced-apart portions during certain desired intervals and the signal derived from the screen actually has the aforesaid given magnitude during these same intervals. If, on the other hand, there takes place a departure from synchronism between beam scan and color signal, then the beam traverses the said spaced-apart portions of the screen structure during intervals whose times of occurrence depart from the times of occurrence of the aforementioned desired intervals by an amount equal to the amount of the departure from synchronism. Of course the actual times of occurrence of the intervals during which the screen derived signal has the aforementioned given magnitude are subject to corresponding departures from their desired times of occurrence. In the past variations in the screen derived signal arising from this cause have been utilized to control the video signal and/or the beam scanning so as to reduce the aforementioned departures from synchronism.

It is apparent that this control technique is increasingly effective as the magnitude of the variation in the screen derived signal caused by any given departure from synchronism becomes greater. However it is also apparent that, in the prior art system which has been briefly described, any given departure from synchronism can produce, at most, only a departure of equal amount in the times of occurrence of the actual intervals during which the screen derived signal has said given magnitude. This, in turn, limits sharply the magnitude of the control signal variations which can be obtained with this system.

Accordingly it is a primary object of the invention to provide an improved color television receiver system.

It is another object of the invention to provide, in a color television receiver, improved apparatus for establishing synchronism between the times of occurrence of the intervals during which the received signal represents information concerning given primary colors and the times of occurrence of the intervals during which the receiver is capable of reproducing these primary colors.

It is still another object of the invention to provide improved apparatus, in a color television receiver, for producing a control signal which varies in response to departures from the aforementioned synchronism and which can therefore be utilized to reduce such departures.

It is a still further object of the invention to provide apparatus, in a color television receiver, for producing a signal which has a given distinctive magnitude during intervals whose times of occurrence depart from desired times of occurrence by an amount which exceeds the amount of the concurrent departure from synchronism between the times of occurrence of intervals during which the received signal represents color information and those of corresponding color reproductive intervals in the receiver.

To achieve the foregoing objects, as well as others which will appear, the screen structure of the cathode ray tube of a receiver embodying my invention is equipped with the aforementioned colored light emissive phosphor strips and also with so-called indexing elements. These indexing elements occupy spaced-apart portions of the screen structure and are characterized by (1) being disposed in a predetermined geometrical relationship to the color phosphor strips and (2) being responsive to electron impingement to produce distinctive indications of such impingement of an intensity which is substantially different from the responses produced by intervening portions of the screen structure. In practice these indexing elements may be constituted of spaced-apart strips of a material such as magnesium oxide which has a much higher secondary electron emission ratio than the other ingredients of the screen structure, or they may be constituted of strips of a phosphor material which emits light of a distinctive color, or the image forming phosphor strips of one color may themselves serve as the indexing elements. In any case, as the electron beam of the cathode ray tube is deflected across the screen structure to form a visible image thereon it also traverses alternately these indexing elements and the intervening portions of the screen structure, thereby causing the production of the aforementioned distinctive indications of one intensity during traversal of indexing elements and of a substantially different intensity (e.g. of substantially zero intensity) during traversal of the intervening portions. Apparatus is then provided for sensing the intensity of these indications and for producing an electrical signal whose magnitude is indicative of this intensity. This electrical signal will therefore have one magnitude during beam traversal of an indexing element and a substantially different magnitude during beam traversal of a portion of the screen structure which intervenes between indexing elements.

In accordance with my invention apparatus is provided, in a receiver embodying my invention, for establishing the said electrical signal at a magnitude representative of beam impingement upon a screen portion intervening between indexing elements during a centrally positioned fraction of each interval during which the beam traverses an indexing element under conditions of proper synchronism, i.e. during the central fraction of each desired interval of indexing element traversal. As a result the electrical signal derived from the screen will assume a magnitude representative of beam impingement upon an indexing element, not during the entire interval of traversal of each indexing element as in the prior art, but only during fractions of this interval, occurring, respectively, at the beginning and end thereof. Further in accordance with my invention there is derived, from this modified electrical signal, an alternating component at a nominal frequency equal to the rate at which the electron beam traverses successive indexing elements. It will be shown hereinafter that the times of occurrence of intervals during which this alternating component is representative of beam traversal of indexing elements are subject to variations which are many times greater than the actual departures from synchronism which give rise to these variations.

The manner in which the aforedescribed apparatus accomplishes the objects of the invention and the particular mode of construction of certain preferred embodiments of my invention will be better understood from the discussion which follows when considered in conjunction with the accompanying drawings wherein.

Figure 1:
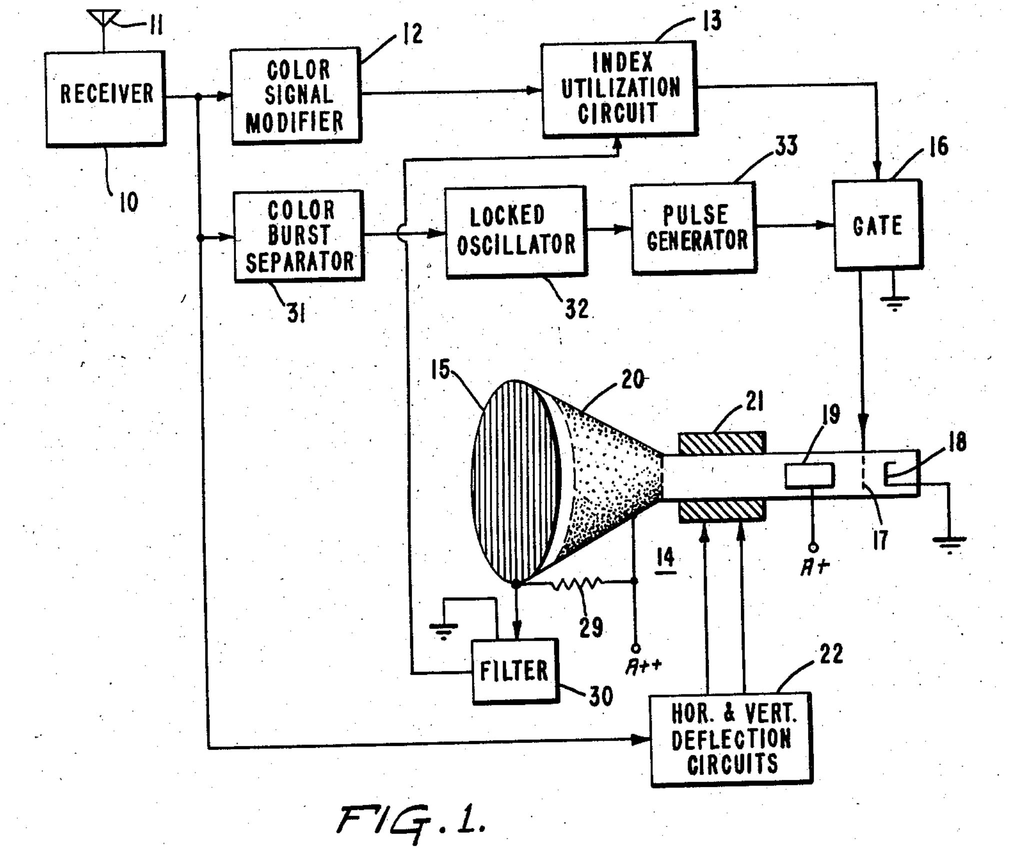
Figure 1 shows one embodiment of my invention in a color television receiver.

Referring now to Figure 1 the color television receiver system illustrated therein comprises a number of conventional components which have been collectively designated as receiver 10 and which may comprise the conventional radio frequency stages, converter, intermediate frequency stages and second detector which are usually found in television receivers. These conventional portions of the system are supplied with a radio frequency signal intercepted by antenna 11 and cooperate to reproduce this intercepted signal reduced to its lowest or video frequency range. In all that follows it will be assumed that this video signal is of the form which is now standard for this country and therefore comprises a unidirectional component which represents the brightness of successively scanned elements of the televised scene and a subcarrier wave of approximately 3.58 megacycles nominal frequency which represents the chromaticity of these same elements. Together these chromaticity and brightness signals represent the intensities of the red, green and blue primary component colors of the televised scene at three different intervals during each period of the subcarrier wave. In addition, of course, the video signal also comprises the usual horizontal and vertical synchronizing signals, as well as the so-called color synchronizing bursts, each one of which consists of a small number of half cycles of an alternating wave having the same nominal frequency as the chromaticity representative subcarrier wave and having reference phase and amplitude therefor. Each such color burst is superposed in the composite signal upon the trailing portion or "back porch" of a horizontal line blanking pulse, the leading portion of which is occupied by a horizontal line synchronizing pulse.

The signal which is thus derived from receiver 10 is supplied to a color signal modifier 12 which is constructed in any conventional manner so as to modify the time-differences which exist within each period of the received chrominance component between the intervals at which the composite signal represents information concerning the red, green and blue primary color components of the televised scene. There are known several forms of apparatus which are effective to carry out such a modification. For example, suitable synchronous demodulators may be used to derive, in separate channels, separate signals respectively representative of the red, green and blue color components of the received signal. These separate signals may then be used to modulate separate subcarrier waves which are locally generated in mutual time-phase relations corresponding to the desired modified time relations. These modulated subcarrier waves are subsequently combined to form the desired modified signal. Alternatively the desired signal modification may be carried out, without decomposing the received signal into separate signals representative of the primary color components, in the manner disclosed in the copending application of Stephen W. Moulton, Serial No. 323,234, filed November 29, 1952, and assigned to the assignee of the present invention. In any case, for reasons which will appear, the color signal modifier is constructed so as to establish differences of substantially one-quarter the period of the subcarrier wave between the times of occurrence of the red, green and blue light representative signal intervals. The output signal from color signal modifier 18 is supplied to an index utilization circuit 13, which operates to modify still further the times of occurrence of the color representative intervals. More particularly this index utilization circuit 13 responds to a control signal derived from cathode ray tube 14 upon whose screen structure 15 the televised scene is to be reproduced to modify the rate of occurrence of successive intervals during which the color signal represents information concerning a given color and the time differences between intervals during which it represents different colors so as to establish absolute synchronism between these intervals and the intervals during which the receiver is reproductive of corresponding colors. To this end the index utilization circuit 13 may take any of a number of known forms, as, for example, that disclosed in the copending application of Robert C. Moore, Serial No. 214,995, filed March 10, 1951, and assigned to the assignee of the present invention.

The output signal from index utilization circuit 13 is supplied, by way of a gate circuit 16 whose purpose will be explained hereinafter, to the beam intensity control grid electrode 17 of the cathode ray tube 14. This cathode ray tube 14 also includes a conventional cathode 18, a conventional first anode 19 which is supplied with a suitable positive potential from a conventional source of first anode potential A+, and a conventional second anode 20 which may take the usual form of a conductive coating on the interior surface of the funnel shaped portion of the cathode ray tube 14 and which is supplied with a suitable positive potential from a conventional source of second anode potential A++.

The cathode ray tube 14 is also equipped with conventional horizontal and vertical deflection coils 21 which are supplied with suitable deflecting signals from conventional horizontal and vertical deflection circuits 22. These deflection circuits are, in turn, synchronized by the synchronizing components of the signal from receiver 10 in the usual manner.

Figure 2:
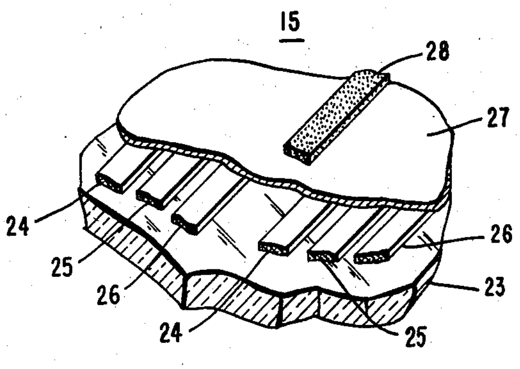
Figure 2 shows an enlarged sectional view of a fragment of the cathode ray tube screen structure of Figure 1.

An enlarged fragmentary view of the cathode ray tube screen structure 15 is shown in Figure 2, to which more particular reference may now be had. This screen structure 15 is formed on the interior surface of the cathode ray tube faceplate 23 and comprises a plurality of groups of vertical phosphor strips, each group consisting of a red light emissive phosphor strip 24, a green light emissive phosphor strip 25 and a blue light emissive phosphor strip 26, these strips being disposed in cyclically recurrent sequence across the screen structure. The individual members of each group of three phosphor strips are preferably slightly spaced from each other while adjoining groups of phosphor strips are spaced from each other by an amount approximately equal to the width of one of the phosphor strips. By reason of this particular disposition of the phosphor strips the scanning electron beam will traverse red, green and blue strips during intervals whose times of occurrence differ by approximately one-quarter of the period of traversal of a group of three strips and the space between this group and the next. It is this disposition of the phosphor strips, which is necessary for reasons pointed out hereinafter, which also requires the presence of color signal modifier 12 in the embodiment of Figure 1. This modifier, it will be recalled, operates upon the standard color video signal so as to make it representative of information concerning the red, green and blue primary component colors of the televised scene at intervals, during each period of the received subcarrier wave, whose times of occurrence differ by amounts equal to one-quarter of the said period.

To complete achievement of the desired synchronism between the times of occurrence of the aforementioned color representative signal intervals and of beam impingements upon corresponding color phosphor strips it now suffices to develop a control signal which varies in response to departures in the times of occurrence of the said actual intervals of beam impingements from those of the desired intervals of such beam impingements and to utilize this control signal so as to minimize such departures. To this end there is superposed upon the phosphor strips 24, 25 and 26, and upon the spaces between them, a metallic layer 27 of electron-permeable thickness. This layer may be made of aluminum, for example, and serves the two-fold purpose of providing an optically reflective surface which intensifies the light radiated from the phosphor strips through the faceplate and of providing a surface of substantially uniformly low secondary electron emissivity confronting the interior of the cathode ray tube. There is further deposited on the interior surface of this metallic layer 27, in alignment with the aforementioned strip-wide spaces between adjacent groups of three phosphor strips, an additional set of strips 28 of a material whose secondary electron emissivity is substantially higher than that of the metallic layer 27. If the metallic layer 27 is made of aluminum, then magnesium oxide is a suitable material for use in strips 28. These strips 28 serve as the indexing elements of the screen structure. Referring to both Figures 1 and 2, an index output resistor 29 is connected between the metallic layer 27 of the screen structure 15 and the second anode 20 of the cathode ray tube 14. Variations in the number of secondary electrons emitted from the screen structure as the electron beam varies in intensity, and as it traverses alternately indexing elements 28 and intervening beam-exposed portions of metallic layer 27, will cause corresponding variations in the current flow through this index output resistor 29. Certain frequency components of these current variations are selectively derived by means of index output filter 30 and are supplied to index utilization circuit 13 as the synchronism control signal.

As has been pointed out, a gate circuit 16 is interposed between the output of index utilization circuit 13 and cathode ray tube control electrode 17. In accordance with my invention this gate circuit is constructed and arranged so as to establish the signal applied to control electrode 17 at a value which cuts off the electron beam during recurrent intervals. Each such cut-off interval has a duration equal to a fraction of the duration of the interval during which the beam traverses one indexing element and each such cut-off interval is centered within one of those intervals during which the beam traverses an indexing element whenever the desired synchronism actually exists in the system. This timing of the beam cut-off intervals is maintained whether or not such synchronism in fact exists. During all other intervals the gate circuit 16 is effective to supply the signal from index utilization circuit 13 to the control electrode 17 without change.

To the foregoing ends the gate circuit 16 may take any one of a number of known forms. For example it may consist of a cathode-follower type of vacuum tube amplifier having both the video signal from circuit 13 and a suitable gating signal applied to the control grid electrode of the vacuum tube. The gating signal for application to gate circuit 16 is derived from the received color synchronizing bursts by means of color burst separator 31, locked oscillator 32 and gating pulse generator 33. As is well known, any given phase position of each cycle of the color bursts occurs at a time which differs by a known amount from the times of occurrence of the various color representative portions of the video signal and therefore also from the times of occurrence of the intervals during which a properly synchronized beam impinges upon corresponding color phosphor strips. The times of occurrence of these intervals of beam impingement, in turn, differ by known amounts (determined by the geometry of the screen structure) from the times of occurrence of the intervals during which a properly synchronized beam impinges on the indexing elements. Therefore gating pulses of suitable duration and occurring at the proper times may be derived from the color bursts merely by constructing the aforementioned separator, oscillator and pulse generator, in a manner well within the skill of a worker in the art, to derive therefrom appropriately poled and appropriately timed pulses, each of a duration equal to the aforementioned fraction of the duration of any one of the intervals during which the beam traverses an indexing element.

The color burst separator 31, locked oscillator 32 and pulse generator 33 may be of any conventional construction suitable for this purpose. For example, the color burst separator may comprise a triode biased so far negatively that it is normally non-conductive and is rendered conductive only by the positive-going blanking signals upon which the color synchronizing bursts are superposed. The output signal of this triode is supplied to a narrow bandpass filter transmissive only of signals of approximately 3.58 megacycles to the substantial exclusion of all other signals, and particularly signals at the horizontal line scanning frequency. The locked oscillator 32, to which the separated color synchronizing bursts are supplied, may be of any conventional form tuned to operate normally at a frequency of 3.58 megacycles and locked in frequency and phase with the intermittent color synchronizing bursts from separator 31. The pulse generator 33, to which the resultant continuous output signal from locked oscillator 32 is supplied, is constructed in such manner that it generates negative-going pulses of sufficient amplitude to cut off the gate circuit 16 in the aforedescribed time relation to the timing of the color bursts. To this end the pulse generator 33 may include the necessary conventional phase-shifting apparatus as well as the usual pulse forming apparatus.

Figures 3A, 3B, 3C:
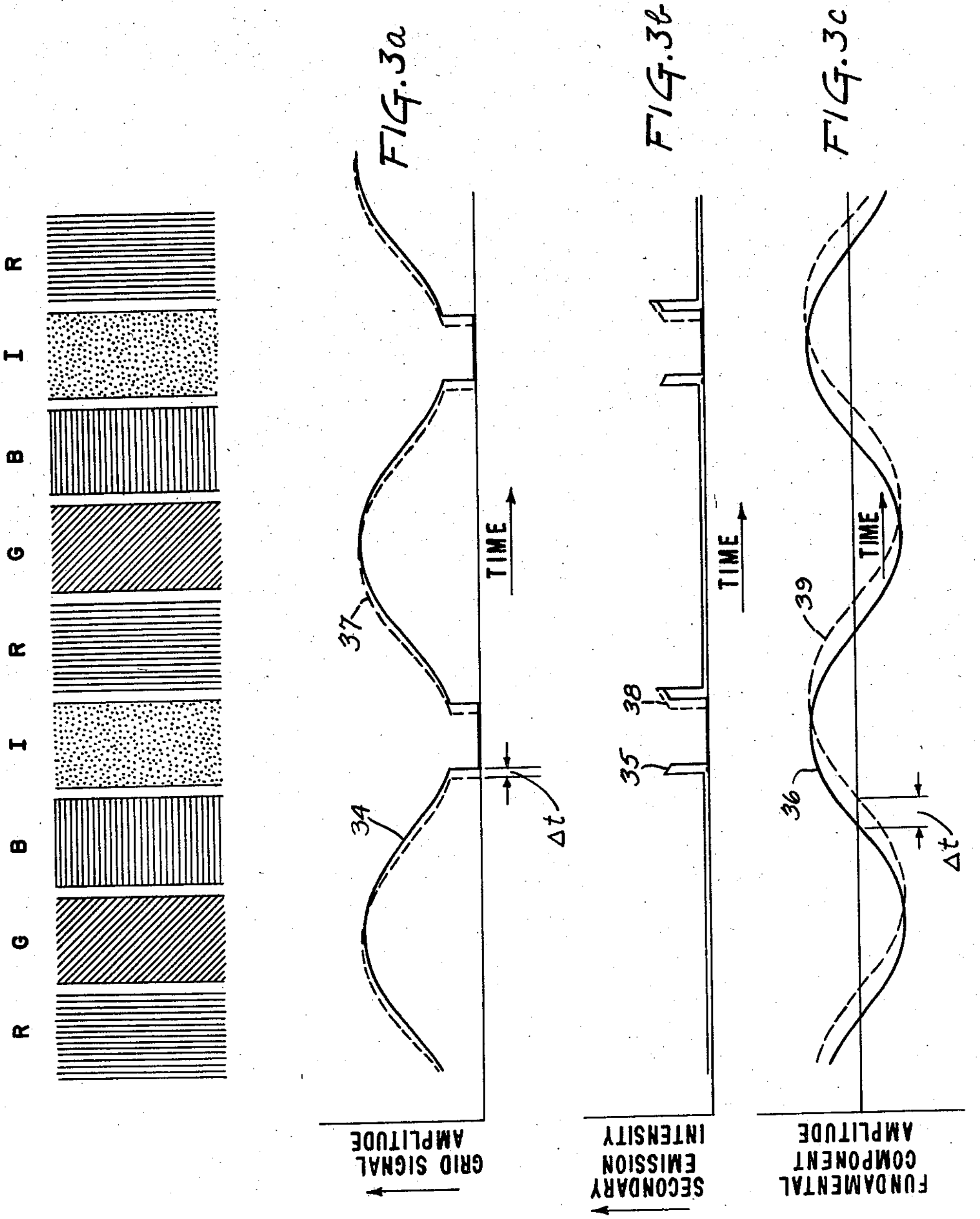
Figure 3 is a diagram of certain signal waveforms which will be referred to in explaining the operation of the system of Figure 1.

Figure 3*a*, to which reference may now be had, illustrates the form of a typical signal which may be applied to the beam intensity control grid 17 of the cathode ray tube 14 as a result of the operation of the aforedescribed apparatus. Time is plotted along the axis of abscissas in Figure 3*a*, while grid signal amplitude is plotted along the axis of ordinates. Since this grid signal amplitude determines the beam intensity of the latter is, in effect, also represented along the axis of ordinates. Directly above the coordinate axes of Figure 3*a* there have also been drawn several vertical strips, respectively designated R, G, B and I, whose respective boundaries indicate, with relation to the axis of abscissas of Figure 3*a*, the boundaries of the time intervals during which the scanning electron beam traverses red, green and blue light emissive phosphor strips and indexing elements of the screen structure. The solid-line sinusoidal curve 34 of Figure 3*a* represents, by its vertical displacement from the axis of abscissas, the instantaneous departure of the grid signal amplitude from the beam cut-off value for the exemplary case in which it is desired to reproduce a predominantly green scene and in which the beam deflection is in fact properly synchronized with the color signal. It will be noted that this curve peaks during traversal of green phosphor strips by the beam, denoting the emission of predominantly green light from the screen structure. During the central portion of each interval during which the beam traverses an indexing element, on the other hand, the grid drive signal is at the beam cut-off value, owing to the operation of gate circuit 16 in the aforedescribed manner. Only during brief intervals occurring at the beginning and end of each interval of beam traversal of an indexing element is the drive signal above the beam cut-off value.

Figure 3*b*, to which reference may now be had, shows, plotted against the same time scale as in Figure 3*a*, the variations in secondary electron emission from the screen structure which take place under the grid signal conditions illustrated in Figure 3*a*. For the case represented by solid-line curve 34 of Figure 3*a*, the resultant changes in secondary emission are represented by solid-line curve 35, whose upward displacements from the time (abscissas) axis represent departures from zero in the number of emitted secondary electrons. It will be seen that comparatively few secondary electrons are emitted during the intervals during which the beam impinges upon phosphor strips and therefore also upon the beam-exposed portions of the metallic layer of low secondary emissivity which is superposed on these phosphor strips. On the other hand, during impingement of the beam upon indexing elements with finite intensity, a much larger number of secondary electrons is emitted. It will be recalled that, in the case under consideration, the beam has zero intensity during passage across all but two small fractions of each indexing element. Consequently sharp increases in the number of secondary emission will occur twice during each interval of beam traversal of an indexing element, once at the beginning and once at the end of the interval. It will be apparent that the resultant current flowing in index output resistor 32 of Figure 1 will also have variations of the form represented by curve 35.

It is believed to be apparent from inspection of Figure 3*b*, and it may also be demonstrated experimentally and analytically, that this current flowing in resistor 32 contains a component which varies sinusoidally with a periodicity equal to the time which elapses between the centers of successive intervals of beam traversal of indexing elements and that this sinusoidal component peaks at the center of each such interval. This sinusoidal component is represented by the solid-line curve 36 of Figure 3*c* in which time is also plotted along the axis of abscissas, again to the same scale as in Figures 3*a* and 3*b*. It is this sinusoidal component which is derived from the screen structure by means of filter 33 of Figure 1 and supplied to the index utilization circuit 13.

Consider now what happens if there takes place a slight departure from the desired synchronous condition which has been described with reference to Figures 3*a* through 3*c*. Assume, for example, that there has taken place a relative displacement $\Delta t$, caused by any one of the aforementioned disturbances, between the times of occurrence of intervals of beam traversal of phosphor strips and the times of occurrence of corresponding color representative intervals in the video signal. This situation is illustrated by a displacement of magnitude $\Delta t$ between each portion of the broken-line curve 37 of Figure 3*a* which denotes a given signal amplitude and the corresponding portion of the solid-line curve 34. If $\Delta t$ exceeds the magnitude of that fraction of each interval of indexing element traversal during which the beam is not cut off under the influence of gate circuit 16 then this beam will become cut off by the operation of gate circuit 16 before it begins to impinge upon each indexing element. This is represented in Figure 3*a* by the fact that broken-line curve 37 reaches the beam cut-off value prior to the beginning of the interval of beam traversal of each indexing element. As a result there will no longer be produced that pulse of intense secondary emission which occurs, under conditions of synchronism, at the beginning of each interval of indexing element traversal; on the other hand that pulse which occurs at the end of each such interval will be of greater duration and greater intensity. This new condition is diagrammatically illustrated by the broken-line curve 38 of Figure 3*b*. Finally it will be apparent that, as illustrated by the broken-line curve 39 of Figure 3*c*, the fundamental frequency component derived from the secondary emission pulses under these new conditions will peak at times which coincide with the times of occurrence of the remaining pulses of intense secondary emission. It will be apparent that the amount $\Delta T$ by which the time of occurrence of a given phase position in the signal derived from the indexing indications during synchronism (curve 36) differs from the time of occurrence of this same phase position during a departure of amount $\Delta t$ from synchronism (curve 39) will be several times greater than this amount $\Delta t$. For example, if the operation of the gating circuit (as determined by the duration of the gating pulse from generator 17) is such that the beam is cut off except during two intervals, each of duration equal to one hundredth of the period of recurrence of indexing element traversals, then a departure of only that amount from synchronism between the color signal and the beam scan will cause one of the two pulses of secondary emission normally produced during each indexing element traversal to disappear altogether. When this happens the electrical indexing signal will no longer peak at the center of each interval of indexing element traversal but rather at the center of the time interval occupied by the remaining secondary emission pulse, i.e. at a time which differs from its prior peak time by approximately eleven one-hundredths of the same period. Thus the apparent departure from synchronism $\Delta T$ represented by variations in the phase of the derived fundamental component will be approximately eleven times as great as the actual departure from synchronism $\Delta t$. In theory the ratio of apparent departure to actual departure from synchronism between color signal and beam scan can be raised to any desired value merely by adjusting the gate pulse width so as to decrease the fraction of the interval of indexing element traversal during which the beam is turned on. In practice, however, this fraction must remain appreciable for otherwise the secondary emission pulses produced during conditions of proper synchronization become too short to be perceived.

Figure 4:
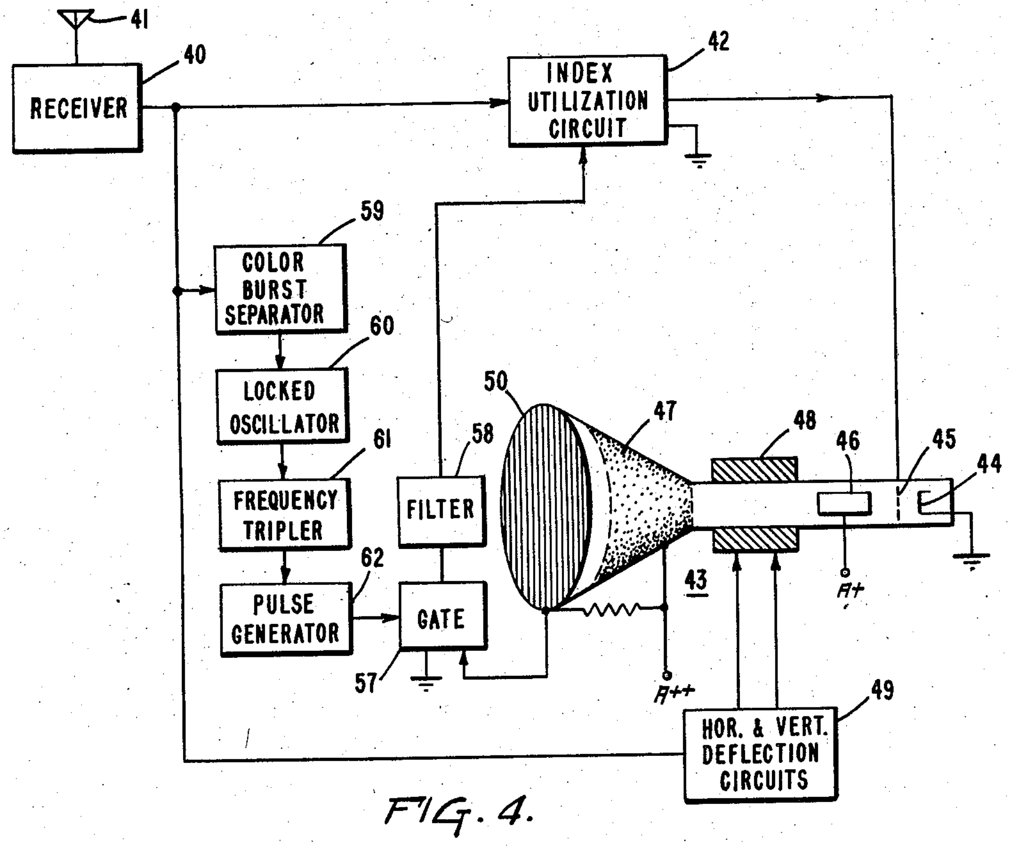
Figure 4 shows another embodiment of my invention.

In the embodiment of Figure 1 those portions of the cathode ray tube faceplate which are occupied by the indexing elements contain no light emissive material. In Figure 4 there is illustrated a color television receiver system embodying my invention in which substantially the entire cathode ray tube faceplate is covered with light emissive material and which is therefore capable of providing an even brighter image than that of Figure 1.

Referring to Figure 4 it will be noted that this receiver system includes a number of components which may be substantially identical to those of Figure 1. More particularly the system of Figure 4 includes a receiver 40 which may be similar, in all respects, to the receiver 10 of Figure 1 and which will therefore reproduce, at its output terminal, the signal intercepted by antenna 41 reduced to its lowest, or video frequency range.

Figure 5:
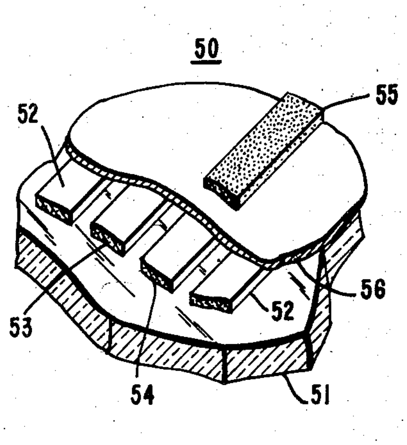
Figure 5 shows an enlarged sectional view of a fragment of the cathode ray tube screen structure of Figure 4.

The receiver system of Figure 4 also comprises an index utilization circuit 42, a cathode ray tube 43 having a cathode 44, a beam intensity control grid electrode 45, a first anode 46 and a second anode 47, these components being similar to the corresponding components of the cathode ray tube 14 of Figure 1. The cathode ray tube 43 of Figure 4 is also equipped with conventional horizontal and vertical deflection coils 48 which receive their deflecting currents in the usual manner from a conventional source 49 of such deflection currents, the source being, in turn, synchronized in conventional manner by the synchronizing components of the video signal reproduced by receiver 40. An enlarged fragmentary view of the screen structure 50 of cathode ray tube 43 is shown in Figure 5 to which more particular reference may now be had. This screen structure is constituted of a glass substrate 51, supporting equally spaced red, green and blue light emissive vertical phosphor strips respectively designated by reference numerals 52, 53 and 54 in Figure 5. Magnesium oxide strips 55 are deposited on the interior side of an electron permeable aluminum film 56 which covers the phosphor strips. These magnesium oxide strips 55, which serve as the indexing elements of the tube, are placed directly behind phosphor strips emissive of light of one particular color, e.g. blue. With the indexing elements thus located directly behind certain phosphor strips, it is no longer practical to turn the beam off during traversal of the major portion of these indexing elements, as was done in the embodiment of Figure 1, in order to prevent the emission of large numbers of secondary electrons during beam traversal of the center portions of these elements, for any attempt to do this would result in loss of light emission from the phosphor strips behind which the indexing elements are located, with consequent distortion of the color of the reproduced scene.

Instead, in the embodiment of Figure 4, the video signal derived from the index utilization circuit 42 is applied to beam intensity control grid 45 of cathode ray tube 43 without interruption. As a result, emission of large numbers of secondary electrons takes place during all portions of each interval during which the beam traverses an indexing element. A gate circuit 57 is then provided in the path followed, externally of the tube, by the electrical signal indicative of the number of secondary electrons emitted by the screen, this gate circuit being constructed so that it permits passage of a signal indicative of the actual intensity of secondary emission only during small fractions of each of those intervals during which a properly synchronized beam would traverse indexing elements, one of these fractional intervals to occur at the beginning and one at the end of each such interval of traversal. At all other times the gate circuit 57 establishes the electrical signal in question at the value which it would have in response to beam impingement upon portions of the screen structure which are not occupied by indexing elements. As a result of this mode of operation the output signal from gate circuit 57 will have substantially the same form as the signal developed across index output resistor 29 in Figure 1. A signal component at a nominal frequency equal to the rate of beam traversal of successive indexing elements is then derived from the output of gate circuit 57 by means of filter 58, which may be of any suitable conventional construction, and is supplied to index utilization circuit 42 as the synchronism control signal of the system. This control signal exhibits the same characteristics as that produced in the system of Figure 1, i.e., its phase is subject to variations indicative of apparent departures from the desired synchronism which are several times greater than the actual departures from such synchronism.

Gate circuit 57 may be of any conventional construction, e.g., it may be similar to gate circuit 16 of Figure 1. Its gating signal may be derived from the received color synchronizing bursts by means of a color burst separator 59, a locked oscillator 60, a frequency tripler 61 and a pulse generator 62. Each of these components may take any one of a number of conventional forms and therefore need not be described in detail here. Suffice it to say that these components are constructed and combined, in accordance with principles well known to any one skilled in the art so as to deliver to gating circuit 57 gating pulses of the aforedescribed form. It will be noted that the signal produced by frequency tripler 61 will cause the production, by pulse generator 62, of gate-opening pulses not only during beam traversal of the edge portions of indexing elements, but also during beam traversal of the edge portions of phosphor strips which are not backed by indexing elements. No harm will result from this since, as has been pointed out, the gate circuit is so constructed that the output signal produced thereby, when it is closed, is substantially identical to the output signal produced by the gate circuit when it is open, provided the beam is then impinging upon portions of the screen structure which contain no indexing elements. Thus passage of the beam across portions of the screen structure which contain no indexing elements will produce no misleading variations in the gate circuit output signal, even if the gate circuit is open.

It will be noted that, in the embodiment of Figure 4, there is provided no color signal modifier to correspond to the color signal modifier 12 of Figure 1. This simplification is possible because the geometrical configuration of the phosphor strips of the screen structure used in the embodiment of Figure 4 is such that the differences between the times of occurrence of the intervals of beam traversal of successive strips emissive of light of different colors are sufficiently nearly the same as the differences between the times of occurrence of the intervals at which the unmodified standard color television signal represents information concerning these different colors.

In the systems of Figures 1 and 4 the control signal derived for application to the index utilization circuit in accordance with my invention has a frequency located within the frequency range occupied by the color representative signal applied to the beam intensity control grid of the cathode ray tube. As a result, there may occur variations in the control signal which are due to variations in the color represented by this video signal rather than to departures from synchronism between the beam scan and the video signal. To avoid this possibility, it has been proposed to modulate the beam intensity not only with the video signal but also with an auxiliary signal, called the pilot-carrier signal, which is of fixed amplitude and at a frequency outside the video frequency range. To avoid the further possibility of undesired interaction which may take place in the electron gun between the video and pilot carrier signals, it has also been proposed to provide two beams of separately controllable intensities within the cathode ray tube, these beams being subject to deflection by the same deflecting fields and being oriented so as to impinge upon the screen structure at very closely spaced points. In such arrangements the intensity of one of the beams was subjected to the control of the video signal while the intensity of the other beam was subjected to the control of the pilot carrier signal. The electrical signal derived from the screen structure then took the form of a signal whose nominal frequency was equal to pilot carrier signal frequency and which was subject to amplitude variations due to traversal by the pilot carrier modulated beam of successive indexing elements. The manner in which my invention may be applied to this improved form of system is shown in Figure 6 of the drawings to which more particular reference may now be had.

Figure 6:
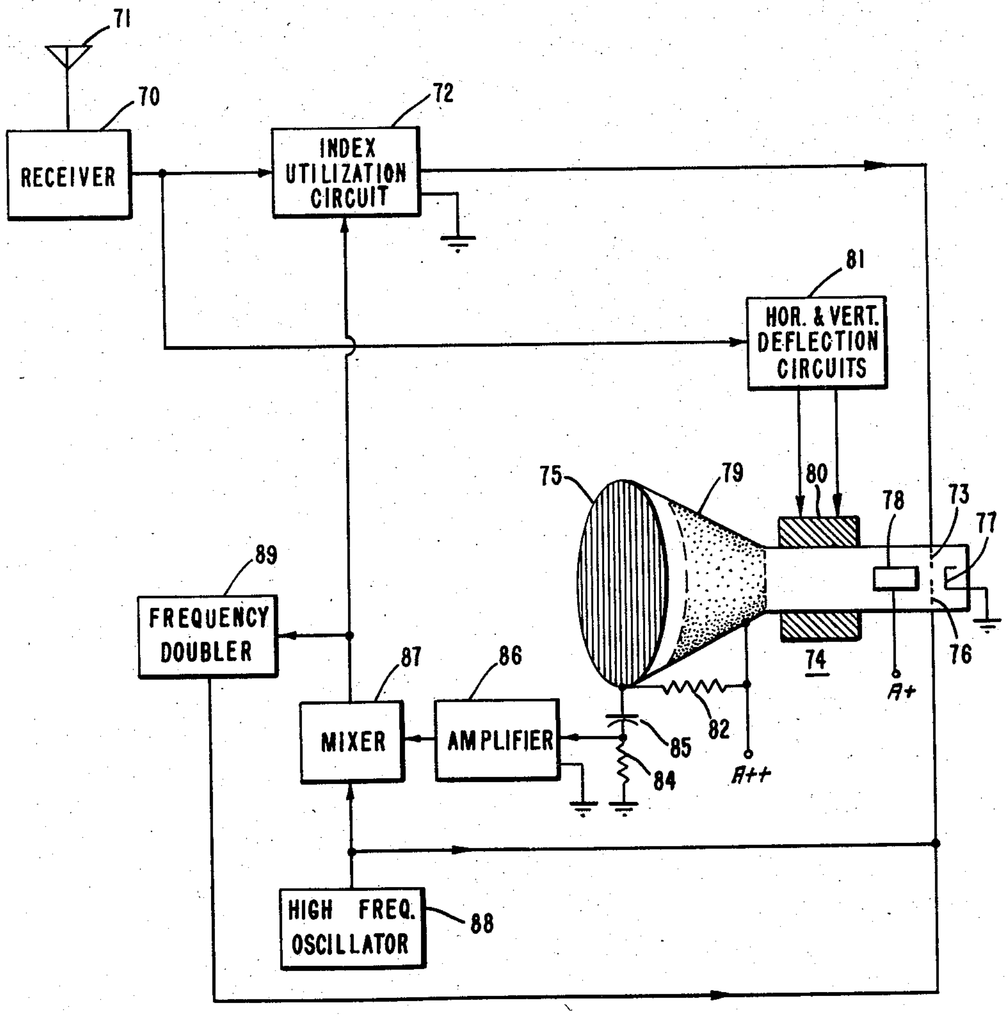
Figure 6 shows the manner in which my invention may be incorporated in a color television receiver which also includes certain other refinements.

The system of Figure 6 includes a receiver 70, an antenna 71 and an index utilization circuit 72, which may be constructed in the same manner and which perform precisely the same functions as the corresponding components in the system of Figures 1 and 4. Thus receiver 70 reproduces the standard television signal intercepted by antenna 71, reduced to its video frequency range, and index utilization circuit 72 operates upon this signal in response to a control signal derived from the receiver cathode-ray tube screen structure so as to establish the desired synchronism between intervals during which the electron beam of this cathode-ray tube traverses colored light emissive phosphor elements of the screen structure and intervals during which the received signal applied to this cathode ray tube represents corresponding color information. The signal produced by index utilization circuit 72 is applied to control grid electrode 73 of cathode ray tube 74 which controls one of the two electron beams projected within this tube toward the screen structure 75 thereof. The other electron beam generated within the cathode ray tube is under the intensity control of grid 76. The manner of construction of an electron gun for producing two beams of separately controllable intensities is described in detail in the copending application of Guy F. Barnett, Gordon R. Spencer, Walter Baghurst and George W. Pratt, Serial No. 428,744, filed May 10, 1954, and assigned to the assignee of the present invention and need, therefore, not be repeated here. Suffice it to say that, in addition to the aforementioned separate control grid electrodes 73 and 76, the cathode ray tube 74 includes a suitable cathode 77, a conventional first anode 78, a conventional second anode 79, and conventional horizontal and vertical deflection yoke 80, the latter being supplied with suitable deflecting signals from a source 81 of such signals. This source 81, in turn, is synchronized in conventional manner by synchronizing signals derived from the received signal reproduced by receiver 70. The screen structure 75 of the cathode ray tube 74 may be of the form illustrated in Figure 5. Variations in the intensity of emission of secondary electrons from this screen structure which occur as the beams scan successive magnesium oxide strips and intervening portions of beam-exposed aluminum will cause current subject to the same variations to flow in the screen output resistor 82 which is connected between the aluminum layer of the screen structure and the second anode 79. Selected ones of these variations are derived by R-C filter 84, 85 and are supplied to an amplifier 86 whose output, in turn, is supplied to one input terminal of a mixer 87. To the other input terminal of mixer 87 there is supplied the output signal from a high frequency oscillator 88. The output signal from mixer 87 is, in turn, supplied to the index utilization circuit 72 as the control signal of the system and is also supplied to the beam intensity control grid electrode 76 by way of frequency doubler 89. Also supplied directly to beam intensity control grid electrode 76 is the output signal from high frequency oscillator 88.

In operation, the high frequency oscillator 88, which may be of any conventional construction suitable for the purpose, is constructed and arranged to produce a signal at a frequency which is considerably above the upper limit of the band of video frequency signals supplied to the beam intensity control grid 73. If, for example, the video signal occupies a range of frequencies extending up to 7 megacycles, then the high frequency oscillator 88 may be tuned to operate at approximately 50 megacycles. One of the signals supplied to beam intensity control grid electrode 76 is then a 50 megacycle signal of unvarying intensity from this high frequency oscillator 88. This same signal is also supplied, by way of R-C network 84, 85 and amplifier 86, to mixer 87 where it is heterodyned with the aforementioned signal derived from the screen structure. For reasons discussed hereinafter, this latter signal is at a frequency which differs from the frequency of the signal produced by oscillator 88 by an amount equal to the desired rate of beam traversal of indexing elements. However, this screen-derived signal is, of course, also subject to phase variations representative of departures from the desired synchronism between beam scanning and color signal. As a result, mixer 87 will produce a difference frequency heterodyne component at a nominal frequency equal to the rate of beam traversal of successive indexing elements and also subject to the aforementioned phase variations. This signal is then suitable for application to index utilization circuit 72 for the usual purpose. It is this same difference frequency signal which is also doubled in frequency by means of frequency doubler 89. As has been pointed out the double frequency signal thus produced is supplied to beam intensity control grid electrode 76, whose non-linear response characteristic is relied upon to produce sum and difference frequency heterodyne components between the signal applied directly from oscillator 88 and that applied from frequency doubler 89. Provided the amplitudes of the signals applied from the oscillator 88 and from frequency doubler 89, respectively, are suitably adjusted, their heterodyne components will include a 50 megacycle signal whose maximum positive amplitude excursions remain below the cut off level of the beam which this signal modulates during two intervals, each one of which occupies one quarter of the time interval required by the electron beam to traverse the space between the centers of successive indexing elements of the screen structure. Since, by reason of the configuration of the screen structure, it takes the electron beam whose intensity is under the control of electrode 76, one-third of the said time interval to traverse each indexing element, this beam can be caused to be cut-off during the major portion of each interval of indexing element traversal merely by appropriate phasing of the aforementioned signal applied from frequency doubler 89. During the initial and final portions of each interval of traversal of an indexing element by this electron beam, on the other hand, the beam will have finite intensity. In resistor 82 there will therefore be produced currents of 50 megacycle frequency occurring intermittently at the beginning and at the end of each traversal of an indexing element by the beam. It may be shown that these intermittent currents have a component at a nominal frequency equal to the difference between the 50 megacycle frequency of the signal produced by oscillator 88 and the rate of traversal of successive indexing elements by the scanning electron beam. This is the component which is derived by means of R-C network 84, 85 and amplifier 86, and which is amplified in the latter and supplied to mixer 87 as previously described. Thus it will be seen that the system of Figure 6 resembles that of Figure 1 in the sense that the beam which produces the indexing signal is cut off during traversal of the major portion of each indexing element and is turned on only during traversal of the initial and final portions thereof. However, this variation is superposed on a 50 megacycle variation so that the resultant current variations lie far outside the range of frequencies occupied by the video signal.

While my invention has been described hereinbefore with specific reference to indexing systems which rely upon differences in the emission of secondary electrons from different portions of the screen structure to yield indexing indications, it will be understood that other differences, e.g., differences in the intensity with which light is emitted from different portions of the screen structure, may be relied upon to produce the distinctive response of different intensities required for my purposes. It will also be understood that the signal derived from the screen structure in the aforedescribed manner need not necessarily be used to operate upon the video signal but may, instead, be used to modify the deflection so as to reestablish the desired synchronism. Alternatively, this screen derived signal may also be used to operate upon both the video signal and the deflection.

In view of these and still other modifications which will occur to those skilled in the art without departing from the scope of my inventive concept, I desire the latter to be limited only by the appended claims.

I claim:

1. In combination: a cathode ray tube comprising a screen structure and means for projecting an electron beam toward said screen structure, said screen structure comprising a plurality of spaced-apart portions and a plurality of intervening portions respectively responsive to electron impingement to produce indications of different intensities; means for deflecting said beam so as to cause it to traverse alternately said spaced-apart and said intervening portions and to traverse said spaced-apart portions during actual time intervals whose times of occurrence are subject to unpredictable departures from those of desired time intervals; means for deriving from said screen-produced indications an electrical signal whose magnitude indicates the intensity of said indications; means for producing a signal which is representative of the times of occurrence of said desired time intervals of beam impingement upon spaced-apart portions; and means for utilizing said last-named signal to establish said electrical signal at a magnitude corresponding to that which indicates beam impingement upon said intervening portions during a centrally located fraction of each of said desired time intervals of beam traversal of a spaced-apart portion.

2. The combination of claim 1 characterized in that said means for establishing said electrical signal at said magnitude comprises means for establishing the intensity of said electron beam at a reference value during each said fraction of desired interval of beam traversal of a spaced-part portion.

3. The combination of claim 1 characterized in that said means for establishing said electrical signal at said magnitude corresponding to that which indicates beam impingement upon intervening portions comprises means disposed in the path traversed by said electrical signal and operative during said fractions of intervals only to establish the magnitude of said signal at a reference value.

4. The combination of claim 1 characterized in that said spaced-apart portions are constituted of materials which are responsive to electron impingement to emit secondary electrons in numbers several times larger than the materials of which said intervening portions are constituted.

5. The combination of claim 4 further characterized in that said means for deriving an electrical signal from said screen-produced indications includes means responsive to the emission of secondary electrons from said screen structure to produce an electrical current whose intensity is proportional to the number of electrons emitted.

6. The combination of claim 5 further characterized in that said means for establishing said screen-derived signal at said magnitude corresponding to that which indicates beam impingement upon said intervening screen portions comprises means for cutting off said electron beam during each said fraction of a desired interval of beam traversal of a spaced-apart screen portion.

7. In combination: a cathode ray tube comprising a screen structure and means for projecting an electron beam toward said screen structure, said screen structure comprising a plurality of spaced-apart portions and a plurality of intervening portions respectively responsive to electron impingement to produce indications of different intensities; means for deflecting said beam so as to cause it to traverse alternately said spaced-apart and said intervening portions and to traverse said spaced-apart portions during actual time intervals whose times of occurrence are subject to unpredictable departures from those of desired time intervals; means for deriving from said screen-produced indications an electrical signal whose magnitude indicates the intensity of said indications; means for establishing said electrical signal at a magnitude corresponding to that which indicates impingement of said beam upon said intervening portions during a fraction of each of said desired time intervals of traversal of a spaced-apart portion, said fraction being located centrally within each said interval; and means for deriving from said last-named electrical signal a component at a nominal frequency equal to the rate of traversal of successive ones of said spaced-apart portions by said electron beam.

8. The combination of claim 1 further characterized in that said spaced-apart portions of said screen structure are constituted by the indexing elements thereof.

9. In a color television receiver: means for producing a composite signal having a unidirectional component representative of the luminance of a televised scene and a carrier wave component representative of the chrominance of said scene, said composite signal being representative of different primary component colors of said scene during time-spaced intervals during each cycle of said carrier wave; means for producing an auxiliary signal which indicates the actual times of occurrence of the said intervals during which said composite signal represents primary colors; a cathode ray tube comprising a screen structure and means for projecting an electron beam toward said screen structure, said screen structure having a plurality of portions respectively responsive to electron impingement to emit light in said different primary colors, portions emissive of light in said different colors being disposed side-by-side in the same sequence in which the intervals occur during which said composite signal represents corresponding primary colors, said screen structure further having spaced-apart portions responsive to electron impingement to produce indications of different intensity from the intervening portions and occupying a predetermined geometrical relationship to said colored light emissive portions; means for deflecting said electron beam so as to cause it to traverse recurrently in said sequence said different colored light emissive screen portions and to traverse alternately said spaced-apart and said intervening portions, thereby to cause said beam to traverse said colored light emissive screen portions and said spaced-apart screen portions during actual intervals whose times of occurrence are subject to unpredictable departures from said times of occurrence of said intervals during which said composite signal represents primary colors; means for deriving from said screen-produced indications an electrical signal whose magnitude indicates the intensity of said indications; means for utilizing said auxiliary signal to establish said electrical signal at a magnitude corresponding to that which indicates beam impingement upon said intervening screen portions during a centrally located portion of each of said intervals during which said composite signal represents one of said primary colors; and means for utilizing said electrical signal with established magnitude to reduce the magnitude of said unpredictable departures.

10. In a color television receiver: means for producing a composite signal having a unidirectional component representative of the luminance of a televised scene and a carrier wave component representative of the chrominance of said scene, said composite signal being representative of different primary component colors of said scene during time-spaced intervals during each cycle of said carrier wave; means for producing an auxiliary signal which indicates the actual times of occurrence of the said intervals; a cathode ray tube comprising a screen structure and means for projecting two electron beams toward said screen structure, said screen structure having a plurality of portions respectively responsive to electron impingement to emit light in said different primary colors, portions emissive of light in said different colors being disposed side-by-side in the same sequence in which the intervals occur during which said composite signal represents corresponding primary colors, said screen structure further having spaced-apart portions responsive to electron impingement to produce indications of different intensity from the intervening portions and occupying a predetermined geometrical relationship to said colored light emissive portions; means for deflecting said electron beams so as to cause them to traverse recurrently in said sequence said different colored light emissive screen portions and to traverse alternately said spaced-apart and said intervening portions, thereby to cause said beam to traverse said colored light emissive screen portions and said spaced-apart screen portions during actual intervals whose times of occurrence are subject to unpredictable departures from said times of occurrence of said intervals during which said composite signal represents primary colors; means for producing an unmodulated signal at a frequency substantially in excess of the highest frequency component of said composite signal; means for utilizing said unmodulated signal to modulate the intensity of one of said electron beams; means for further modulating the intensity of said one electron beam so as to cut said beam off during a centrally located portion of each of said intervals during which said composite signal represents one of said primary colors; means for deriving from said screen-produced indications an electrical signal at a nominal frequency which differs from the frequency of said unmodulated signal by an amount equal to the rate at which said beam intensity is further modulated; and means for utilizing said electrical signal to reduce the magnitude of said unpredictable departures.

References Cited in the file of this patent

UNITED STATES PATENTS

| | | |
|---|---|---|
| 2,657,257 | Lesti | Oct. 27, 1953 |
| 2,667,534 | Creamer | Jan. 26, 1954 |
| 2,671,129 | Moore | Mar. 2, 1954 |
| 2,674,651 | Creamer | Apr. 6, 1954 |